United States Patent [19]

Millet

[11] Patent Number: 4,511,686

[45] Date of Patent: Apr. 16, 1985

[54] CYANOACRYLATE ADHESIVE COMPOSITION CONTAINING TANNINS

[75] Inventor: George H. Millet, Oakdale, Minn.

[73] Assignee: Minnesota Mining and Manufacturing Company, St. Paul, Minn.

[21] Appl. No.: 551,294

[22] Filed: Nov. 14, 1983

[51] Int. Cl.$^3$ .............................................. C08F 15/02
[52] U.S. Cl. ................................. 524/110; 156/331.2; 427/385.5; 524/291; 524/739; 526/201; 526/204; 526/210; 526/213; 528/480
[58] Field of Search ....................... 524/110, 291, 739; 526/201, 204, 210, 213; 156/331.2; 427/385.5; 528/480

[56] References Cited

U.S. PATENT DOCUMENTS

| | | | |
|---|---|---|---|
| 3,507,822 | 4/1970 | Okudo-boache | 523/109 |
| 3,832,334 | 8/1974 | O'Sullivan et al. | 526/225 |
| 4,139,693 | 2/1979 | Schoenberg | 526/297 |
| 4,196,271 | 4/1980 | Yamada et al. | 525/242 |

OTHER PUBLICATIONS

Haslam, *Chemistry of Vegetable Tannins*, Chap. 4, pp. 66–90 and 91–142, (Academic Press, 1966).
"Leather", *Kirk–Othmer Encyclopedia of Chemical Technology*, 2nd Ed., vol. 12, pp. 314–325.
Webb, *Chemistry of Wine Making*, pp. 62–68, (American Chemical Society Advances in Chemistry Series No. 137, 1974).

*Primary Examiner*—Maurice J. Welsh
*Attorney, Agent, or Firm*—Donald M. Sell; James A. Smith; David R. Cleveland

[57] ABSTRACT

Cyanoacrylate adhesive compositions containing a tannin, e.g., digallic acid, tannic acid, or other hydrolyzable or condensed tannin. The inclusion of tannin increases adhesion and heat resistance of the cured adhesive on metal substrates.

17 Claims, No Drawings

CYANOACRYLATE ADHESIVE COMPOSITION CONTAINING TANNINS

Technical Field

This invention relates to adhesion and heat resistance promotors for cyanoacrylate adhesive compositions.

A variety of adhesion promotors have been suggested for use in cyanoacrylate adhesives in order to improve the bonding of such adhesives to metals (e.g., steel). One class of such adhesion promotors is described in U.S. Pat. No. 4,139,693 (Schoenberg), and has the formula

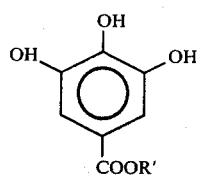

wherein R' is hydrogen or an alkyl, aryl or cycloalkyl group having 1 to 10 carbon atoms. Esters wherein R' is an alkyl group of 1–6 carbon atoms are said to be preferred. Gallic acid monohydrate, methyl gallate, propyl gallate and hexyl gallate are named or exemplified in Schoenberg.

A variety of types of additives have been suggested for use in improving the heat resistance of cyanoacrylate adhesives. Typical heat resistance promoters (e.g., maleic anhydride, shown in U.S. Pat. No. 3,832,334) do not improve the initial adhesion of cyanoacrylate adhesives to metals, but do reduce the loss of adhesion which typically occurs after long-term heat aging of a cured bond of such adhesive. Some heat resistance promoters (e.g., benzophenonetetracarboxylic dianhydride, shown in U.S. Pat. No. 4,196,271) also function as adhesion promoters, that is, they both improve the initial adhesion of cyanoacrylate adhesives to metals and reduce the loss of adhesion which occurs after long-term heat aging of a cured bond of the adhesive.

U.S. Pat. No. 3,507,822 (Miyami) describes a tooth coating composition containing a vinyl resin and 0.01 to 2 percent by weight cyanoacrylate monomer. To prevent premature polymerization, Miyami suggests that the composition contain "5 to 50% by weight of an inorganic acid" based on the weight of the cyanoacrylate monomer. Tannic acid is listed among the inorganic acids mentioned by Miyami. Example 1 of Miyami describes a "Wood coating" containing 100 parts vinyl resin solution, 10 parts dibutyl phthalate, 0.4 parts methyl cyanoacrylate, 0.2 parts tannic acid, and 0.2 parts pigment. Example 3 of Miyami describes a "Tooth coating" containing 100 parts vinyl resin solution, 30 parts benzyl butyl phthalate, 0.4 parts ethyl cyanoacrylate, 0.2 parts tannic acid, and 0.1 parts tin fluoride.

DISCLOSURE OF INVENTION

Although gallic acid and the esters of gallic acids described in Schoenberg may provide an improvement in the adhesion of cyanoacrylate adhesives to metals, that improvement may disappear if cured bonds of such adhesive are aged for extended periods of time at elevated temperatures (e.g., by aging at temperatures of 90° C. or more for periods of time of one week or more). Tests using 0.1 weight percent gallic acid, methyl gallate, or propyl gallate in ethyl cyanoacrylate show that all three are adhesion promoters, as they increase initial overlap shear strength on cold rolled steel by about 41 to 43 percent. However, methyl gallate and propyl gallate do not function as heat resistance promoters (i.e., cured, heat-aged bonds thereof have no better adhesion than corresponding bonds prepared from ethyl cyanoacrylate alone). Gallic acid does function as a heat resistance promoter, since cured, heat-aged bonds thereof have adhesion about twice that obtained using ethyl cyanoacrylate alone.

The present invention provides, in one aspect, a cyanoacrylate adhesive composition, comprising (a) ten weight percent or more of cyanoacrylate monomer, based on the weight of said adhesive composition, and (b) an effective amount of tannin. In another aspect, the present invention provides a cyanoacrylate adhesive composition, comprising (a) cyanoacrylate monomer and (b) more than about 0.01 and less than about 5 weight percent of tannin, based on the weight of said cyanoacrylate monomer. Tannin functions in the invention as both an adhesion and heat resistance promoter, and appears to be comparable to gallic acid, methyl gallate, and propyl gallate in its adhesion promoter capacity, and superior thereto in its heat resistance promoter capacity.

The present invention also provides a method for making adhesive bonds, and bonded articles made thereby.

DETAILED DESCRIPTION

In the practice of the present invention, the cyanoacrylate monomer typically is an ester of 2-cyanoacrylic acid, and a liquid at room temperature and atmospheric pressure. Preferred cyanoacrylate monomers have the formula

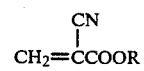

wherein R is a $C_{1-16}$ alkyl, cycloalkyl, alkenyl, cycloalkenyl, or aryl radical. R can be unsubstituted or can be substituted with groups which do not adversely affect the adhesive utility of the cyanoacrylate monomer, and can contain hetero atoms (e.g., oxygen) which likewise do not adversely affect such utility. R can be, for example, methyl, ethyl, n-propyl, isopropyl, n-butyl, isobutyl, sec-butyl, octyl, ethylhexyl, docecyl, ethoxyethyl, benzyl or chloroethyl. Preferably R is cyclohexyl, alkoxyalkyl or a $C_{1-6}$alkyl or alkenyl radical. Most preferably, R is methyl, ethyl, n-butyl, or allyl. The cyanoacrylate monomer can be used singly or in admixture. Methods for preparing the cyanoacrylate monomer are well known to those skilled in the art, and cyanoacrylate monomers suitable for use in this invention are commercially available from a variety of sources.

The amount of cyanoacrylate monomer can be varied to suit particular applications. For example, compositions containing a particulate filler typically contain ten weight percent or more cyanoacrylate monomer. A preferred amount of cyanoacrylate monomer is 50 weight percent or more of the total weight of the adhesive composition.

Tannins for use in the present invention can have a variety of structures. Many tannins are natural products containing a mixture of compounds (many of which can themselves be called tannins) whose structures are not understood or subject to disagreement. Tannins suitable for use in the present invention are of two types, namely, hydrolyzable tannins and condensed tannins.

Hydrolyzable tannins are soluble in mineral acids and yield gallic acid or ellagic acid upon hydrolysis. Hydrolyzable tannins yielding gallic acid upon hydrolysis will be referred to herein as gallotannins. Hydrolyzable tannins yielding ellagic acid upon hydrolysis will be referred to herein as ellagitannins. Preferred hydrolyzable tannins include digallic acid, having the formula

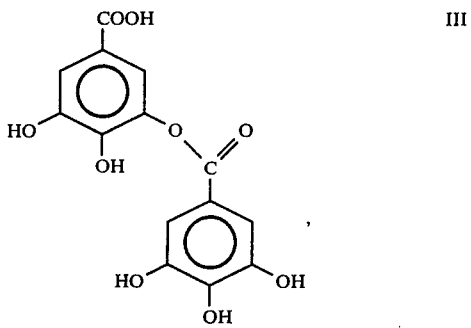

pentadigalloylglucosides (e.g., beta-penta-m-digalloyl-D-glucose), and pentagalloylglucosides (e.g., beta-penta-O-galloyl-D-glucose). The aforementioned beta-penta-m-digalloyl-D-glucose typically is referred to as "tannic acid" and will be so identified herein. Also preferred are natural products (e.g., solid or liquid extracts), containing mixtures of hydrolyzable tannins, e.g., Chinese gallotannin and Turkish gallotannin (both of which are obtained from gallnuts), chestnut wood, myrobalans, and valonia. Other hydrolyzable tannins suitable for use in the present invention are shown in Chapter 4 of Haslam, *Chemistry of Vegetable Tannins,* pp 91-142 (Academic Press, 1966) and in the article entitled "Leather", *Kirk-Othmer Encyclopedia of Chemical Technology,* 2nd. Ed., Vol. 12, pp 314-324 (1967).

Condensed tannins form a precipitate in mineral acid. Typically, such tannins are characterized as condensation polymers of flavan-3-ols and flavan-3,4-diols. A preferred condensed tannin for use in the present invention is obtained from grape skins or stems, and is known as "wine tannin" or "grape tannin". Wine tannin typically is a condensed polymer of a flavan-3-ol having the formula:

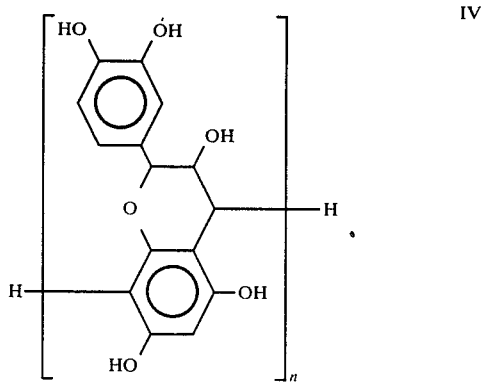

wherein n is 2 to 10. Another suitable condensed tannin can be obtained by extraction from decaffeinated tea leaves, cecaffeination being desirable to avoid premature polymerization of the cyanoacrylate monomer. Also preferred are natural products containing mixtures of condensed tannins, e.g., divi-divi, gambier, hemlock bark, mangrove cutch, quebracho, and wattle bark. Other condensed tannins suitable for use in the present invention are described in Chapter 3 of Haslam, pages 66–90, on pages 324 and 325 of the aforementioned Kirk-Othmer article, and in Webb, *Chemistry of Wine Making,* pp 62–68 (Americal Chemical Society Advances in Chemistry Series No. 137, 1974).

Mixtures of more than one tannin, or of hydrolyzable tannins and condensed tannins, can be used if desired. For example, the mixture of hydrolyzable and condensed tannins obtained from eucalyptus can be employed. Tannins obtained in the form of liquid extracts preferably are dried to a solid before use. Also, it is desirable to purify the tannin to remove substances which may initiate polymerization of cyanoacrylate monomers or adversely affect the storage or handling performance thereof. If desired, the tannin can contain or be modified to contain substituent groups (e.g., alkyl, trialkylsilyl, nitro, halo, and the like) which do not initiate polymerization of cyanoacrylate monomers.

As used herein, an effective amount of tannin is an amount which increases the overlap shear strength of a cyanoacrylate monomer on a steel substrate by more than the experimental error (about ten percent) typically encountered in overlap shear strength testing. The upper limit on the amount of tannin employed typically is governed by solubility considerations. For example, the room temperature solubilities of digallic acid, tannic acid, and wine tannin in ethyl cyanoacrylate are about 0.1 weight percent, about 0.3 weight percent, and about 0.6 weight percent, respectively. Higher amounts of tannin (e.g., up to less than about 5 weight percent based on the weight of cyanoacrylate monomer) can be used if a cosolvent or diluent is included in compositions of the invention. Expressed on a weight basis the amount of tannin preferably is about 0.01 to one weight percent, more preferably about 0.05 to 0.3 weight percent, based upon the weight of cyanoacrylate monomer.

Other known adjuvants for use in cyanoacrylate adhesives, such as thickeners, fillers, extenders, crosslinking agents, anionic polymerization inhibitors, radical stabilizers, other adhesion promoters, other heat resistance promoters, water resistance promoters, wetting agents, and the like can be included in compositions of the invention. The amounts and types of such adjuvants will be well known to those skilled in the art.

The following examples are offered to aid understanding of the present invention.

EXAMPLE 1

A composition of the invention containing cyanoacrylate monomer ("CA-3" ethyl cyanoacrylate, commercially available from 3M) and tannic acid was prepared by combining the ingredients shown below in Table I, Run 5, in the amounts indicated. Control compositions containing respectively cyanoacrylate monomer alone (Run 1), cyanoacrylate monomer and gallic acid (Run 2), cyanoacrylate monomer and methyl gallate (Run 3) and cyanoacrylate monomer and propyl gallate (Run 4) were also prepared using the amounts shown in Table I. Each composition was prepared by combining the indicated ingredients and shaking until a homogeneous solution was achieved. The resulting adhesive was stored in a polyethylene bottle (commercially available from Alpha Techno, Inc.) equipped with a dispensing nozzle.

Six overlap shear bonds were made with each adhesive using 25.4 mm by 102 mm by 0.84 mm C1018 cold rolled steel ("CRS") coupons. The bonding surfaces of each coupon were prepared by acetone degreasing, 220 grit sandpaper abrading, and acetone cleaning. One drop of adhesive was applied to one of the coupons and the second coupon used to spread the adhesive evenly over an area of 3.23 cm² (12.7 mm overlap). The coupons were held together with two binder clips (No. 5 medium, commercially available from IDL Manufacturing and Sales Corp.) until handling strength was achieved. The bonds were aged for a total of 72 hours at 23° C., and then three bonds of each adhesive were tested for overlap shear strength using a Thwing-Albert tensile tester, operated at a jaw separation rate of 2.54 mm/min. The remaining bonds were aged in a forced air oven for one week at 93° C., removed from the oven, cooled to room temperature, and tested for overlap shear strength. Set out below in Table I are the run no., identity and amount of comparison material (Runs 1–4) or tannin (Run 5), initial overlap shear strength, percent increase of the initial value over that obtained in Run 1, overlap shear strength after aging, and percent loss as a result of aging for each of Run Nos. 1 through 5:

TABLE I

| | Comparison material or tannin | | Overlap shear strength, MPa | |
|---|---|---|---|---|
| Run no. | Identity | Weight % | Initial (% increase over Run 1) | Aged (% decrease Initial to Aged) |
| 1 | — | — | 13.9 (—) | 2.7 (−81) |
| 2 | Gallic acid | 0.1 | 19.6 (41) | 5.8 (−71) |
| 3 | Methyl gallate | 0.1 | 19.5 (41) | 2.4 (−87) |
| 4 | Propyl gallate | 0.1 | 19.8 (43) | 2.3 (−88) |
| 5 | Tannic acid | 0.1 | 19.5 (41) | 9.6 (−51) |

This example shows the improvement obtained by combining cyanoacrylate and tannic acid. Compared to the use of cyanoacrylate alone, initial adhesion was improved, indicating that tannic acid is an adhesion promoter. After aging, Run 5 retained 49% of its initial strength, whereas Run 1 (cyanoacrylate alone) retained only 19% of its original strength, indicating that tannic acid also is a heat resistance promotor. In comparison to gallic acid, methyl gallate, and propyl gallate, tannic acid provided a similar improvement in initial adhesion and a superior retention of adhesion after heat aging. After aging, the bond strength of Run 5 was over three and one half times that obtained through the use of cyanoacrylate alone (see Run 1). The bond strength of Run 2 was only 2.1 times that obtained in Run 1. The bond strengths of Runs 3 and 4 were actually less than that obtained in Run 1.

EXAMPLE 2

Using the method of Example 1 (but with a different bottle of ethyl cyanoacrylate, having a lower overlap shear strength than the ethyl cyanoacrylate used in Example 1) several tannins were evaluated for overlap shear strength. Set out below in Table II are the run no., type and amount of tannin, and the overlap shear strength for the resulting compositions, measured initially and after aging for seven or fourteen days at 93° C.

TABLE II

| | Tannin | | Overlap shear strength, MPa | | |
|---|---|---|---|---|---|
| Run no. | Identity | Weight % | Initial | Aged 7 days, 93° C. | Aged 14 days, 93° C. |
| 1 | — | — | 9.8 | 2.6 | 2.3 |
| 2 | Tannic acid | 0.1 | 16.5 | 11.8 | 9.5 |
| 3 | Digallic acid | 0.1 | 16.6 | 8.7 | 7.2 |
| 4 | Wine tannin[1] | 0.1 | 15.7 | 10.6 | 9.0 |

[1] A tan powder, commercially available from Dover Winemakers, Cleveland OH.

This example illustrates the use of several tannins, and the effect of tannin selection upon initial and heat-aged overlap shear strength.

EXAMPLE 3

Using the method of Example 1, various comparison materials and tannic acid were evaluated for overlap shear strength on 1.6 mm thick 2024-T3 aluminum coupons which had been abraded using green "Scotchbrite" abrasive pads (commercially available from 3M) and wiped with acetone prior to bonding. Set out below in Table III are the run no., comparison material or tannin identity and amount, and the overlap shear strength for the resulting compositions, measured initially and after aging for one week at 93° C.

TABLE III

| | Comparison material or tannin | | Overlap shear strength, MPa | |
|---|---|---|---|---|
| Run no. | Identity | Weight % | Initial | Aged |
| 1 | — | — | 3.8 | 1.5 |
| 2 | BTDA[1] | 0.1 | 15.7 | 16.6 |
| 3 | Gallic acid | 0.1 | 17.1 | 10.3 |
| 4 | Methyl gallate | 0.1 | 16.2 | 7.3 |
| 5 | Tannic acid | 0.1 | 17.4 | 16.7 |

[1] Benzophenonetetracarboxylic dianhydride

This example illustrates the use of a composition of the invention on aluminum. As an adhesion promoter, tannic acid was superior to BTDA, and was comparable to gallic acid and methyl gallate. As a heat resistance promoter, tannic acid was superior to gallic acid and methyl gallate, and was comparable to BTDA.

EXAMPLE 4

A two-part adhesive composition was prepared as follows. The first part contained 73 weight % ethyl cyanoacrylate ("Three Bond 1741", commercially available from Three Bond, Inc. of America), 20 weight % of a granulated MBS terpolymer ("Blendex BTA III F", commercially available from Rohm and Haas Company) which had been treated to remove cyanoacrylate polymerization-causing impurities, 7 weight % diphenylmethane, and 75 ppm sulfur dioxide (in addition to any sulfur dioxide already present in the ethyl cyanoacrylate). The second part contained 6 weight % ethanol, 6 weight % tetrabutylammonium tetrafluoroborate, and 88 weight % diethylene glycol diacetate ("Cellosolve Acetate", commercially available from Union Carbide Corp.). The two parts were mixed together in the ratio of 10 grams of the first part to 0.32 grams of the second part, shaken for 30 seconds, and applied to 1.7 mm thick C1018 CRS coupons which had been cleaned using the method of Example 1. An overlap shear strength of 16.6 MPa was obtained.

The treatment method used to remove cyanoacrylate polymerization-causing impurities from the MBS terpolymer was carried out as follows. All washes were performed at 60° C. A 300 gram portion of terpolymer was washed five times with 3.5 liter portions of deionized water. The filtercake was washed once with a solution of 2 milliliters of 28 weight % hydrochloric acid in 3.5 liters of methanol, followed by washing and filtering four times with 3.5 liter portions of methanol. The filtercake was washed once with water, filtered, and dried for 16 hours at 49° C. and about 60 mm Hg.

EXAMPLE 5

Using the method of Example 1, tannic acid was combined with cyanoacrylate monomer at several addition levels. The resulting adhesive compositions were applied to 1.7 mm thick C1018 CRS coupons. Three bonds of each adhesive were aged for 21 hours at room temperature and 1 hour at 93° C., cooled to room temperature, and evaluated for overlap shear strength using an Instron tensile tester operated at a jaw separation rate of 2.5 mm/min. Failure modes were evaluated as "adhesive", "cohesive", or as a combination of cohesive and adhesive based upon visual examination of the sheared bond samples. An adhesive ("A") failure mode is one in which delamination occurred at the adhesive-adherend interface. A cohesive ("C") failure mode is one in which delamination occurred within the adhesive layer. A cohesive/adhesive (e.g., "0.2C/0.8A") failure mode is one in which both cohesive and adhesive failure modes were observed (e.g., 20% cohesive/80% adhesive). Set out below in Table IV are the run no., amount of tannin, overlap shear strength, and failure mode for each run.

TABLE IV

| Run no. | Tannin, wt. % | Overlap shear strength, MPa (failure mode) |
| --- | --- | --- |
| 1 | — | 13.0 (A) |
| 2 | 0.01 | 14.9 (A) |
| 3 | 0.05 | 19.8 (0.2C/0.8A) |
| 4 | 0.10 | 23.9 (0.5C/0.5A) |
| 5 | 0.20 | 22.8 (0.9C/0.1A) |
| 6 | 0.30 | 20.5 (0.9C/0.1A) |

This example illustrates the use of various amounts of tannin in compositions of the invention. For the particular tannin employed (i.e., tannic acid), use of 0.05 weight percent or more tannin provided high overlap shear strength and a desirable bias toward cohesive failure.

Various modifications and alterations of this invention will be apparent to those skilled in the art without departing from the scope and spirit of this invention and the latter should not be restricted to that set forth herein for illustrative purposes.

What is claimed is:

1. A cyanoacrylate adhesive composition, comprising (a) ten weight percent or more of cyanoacrylate monomer, based on the weight of said adhesive composition, and (b) an effective amount of tannin.

2. A composition according to claim 1, wherein said cyanoacrylate monomer has the formula

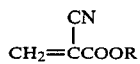

wherein R is a substituted or unsubstituted $C_{1-16}$ alkyl, cycloalkyl, alkenyl, cycloalkenyl, or aryl radical.

3. A composition according to claim 1, wherein said tannin comprises a hydrolyzable tannin.

4. A cyanoacrylate adhesive composition, comprising (a) ten weight percent or more of cyanoacrylate monomer, based on the weight of said adhesive composition, and (b) an effective amount of tannin comprising a gallotannin.

5. A cyanoacrylate adhesive composition, comprising (a) ten weight percent or more of cyanoacrylate monomer, based on the weight of said adhesive composition, and (b) an effective amount of tannin comprising an ellagitannin.

6. A composition according to claim 4, wherein said tannin comprises digallic acid.

7. A composition according to claim 3, wherein said tannin comprises a pentadigalloylglucoside or a pentagalloylglucoside.

8. A composition according to claim 3, wherein said tannin comprises tannic acid.

9. A cyanoacrylate adhesive composition, comprising (a) ten weight percent or more of cyanoacrylate monomer, based on the weight of said adhesive composition, and (b) an effective amount of tannin comprising a condensed tannin.

10. A composition according to claim 9, wherein said tannin comprises a condensation polymer of a flavan-3-ol or a flavan-3,4-diol.

11. A composition according to claim 9, wherein said tannin comprises a wine tannin.

12. A cyanoacrylate adhesive composition, comprising (a) cyanoacrylate monomer and (b) more than about 0.01 and less than about 5 weight percent of tannin, based on the weight of said cyanoacrylate monomer.

13. A composition according to claim 12, wherein said tannin comprises tannic acid.

14. A composition according to claim 12, comprising about 0.01 to 1 weight percent tannin.

15. A composition according to claim 12, comprising about 0.05 to 0.3 weight percent tannin.

16. A bonded article, comprising a layer of a composition according to claim 1 disposed between and in contact with two or more adherends.

17. A method for bonding two adherends together, comprising the steps of:
 (a) applying to one or both of said adherends a layer or layers of a polymerizable cyanoacrylate adhesive composition comprising (i) ten weight percent or more of cyanoacrylate monomer, based on the weight of said adhesive composition, and (ii) an effective amount of tannin, and
 (b) mating said adherends to one another so that said layer or layers of said adhesive composition are disposed therebetween, and allowing said adhesive composition to cure.

* * * * *